May 11, 1965
W. SOPICKI ETAL
3,183,336
INERT GAS WELDING TORCH WITH A DELAY DEVICE FOR THE GAS VALVE
Filed June 8, 1962
2 Sheets-Sheet 1
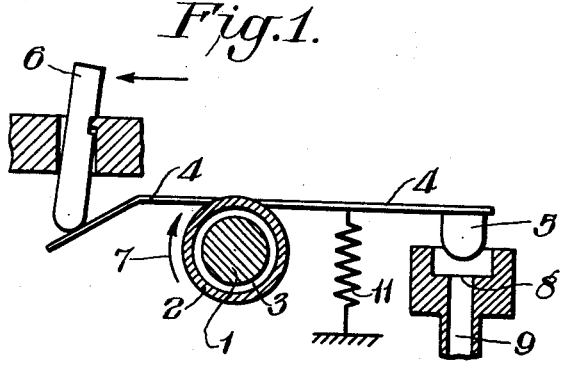
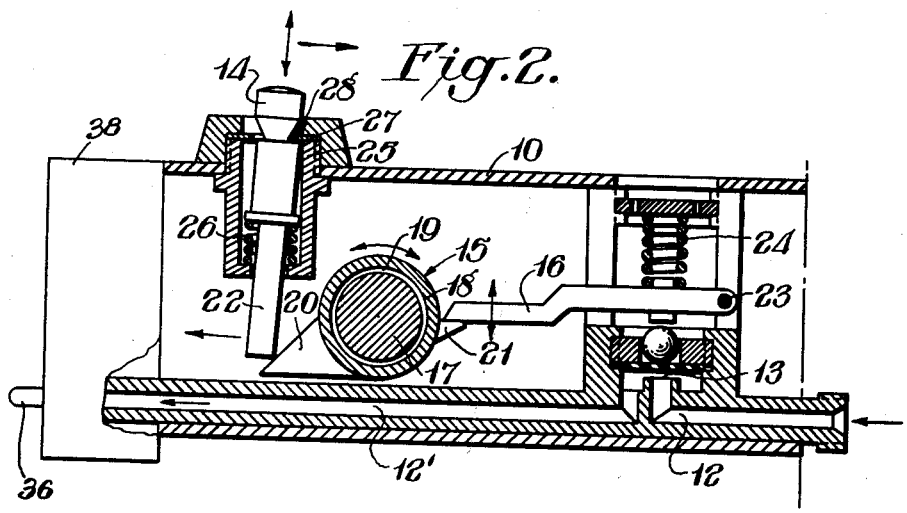
INVENTORS
Walter Sopicki
Günther Hannappel
BY Connolly and Hutz
ATTORNEYS INVENTORS
Walter Sopicki
Günther Hannappel
BY Connolly and Hutz
ATTORNEYS 3,183,336
INERT GAS WELDING TORCH WITH A DELAY DEVICE FOR THE GAS VALVE
Walter Sopicki, Schwalbach, Taunus, and Günther Hannappel, Frankfurt am Main, Germany, assignors to Knapsack-Griesheim Aktiengellschaft, Knapsack, near Cologne, Germany, a corporation of Germany
Filed June 8, 1962, Ser. No. 201,172
Claims priority, application Germany, June 10, 1961, K 43,963; Feb. 10, 1962, K 45,862
5 Claims. (Cl. 219—75)

The present invention relates to an inert gas welding torch with a delay device for the gas valve. In one embodiment the delay device is provided with means to minimize the effect of changes in temperature.

For inert gas welding, particularly with tungsten electrodes, it is necessary both in the case of air and water-cooled torches that the electrode after turning off the welding current is still surrounded with the inert gas until it has cooled down. If this is not done, the electrode will be oxidized at least partially, whereby a further operation is rendered difficult. Besides, upon the occurrence of oxidation at the electrode, it becomes necessary at certain time intervals to extend more of the electrode and to renew the point thereon.

In order to attain a continued flowing of the inert gas, it is known to provide behind the closing valve of the inert gas conduit leading to the torch an afterflow container. This is arranged outside of the handgrip of the torch and contains a gas holding nozzle on the torch side. If upon turning off the welding current the inert gas valve arranged in front of the afterflow container is simultaneously closed, then inert gas will continue to flow from the torch nozzle and thereby to protect the electrode for such a period of time until the gas pressure present in the container and in the conduit lying behind the valve has fallen to atmospheric pressure.

This known arrangement has the disadvantage that it requires a rather voluminous device including an electric pressure button at the torch, a step switching relay and a magnet valve for the inert gas. Furthermore, the protection of the electrode and of the workpiece by the gas at the beginning of the welding process during the period of filling the relatively large afterflow container is insufficient unless one undertakes a lengthy pre-flow of gas in view of the required high quality, also of the beginning of the welding seam, which however results in an increased consumption of gas.

In order to overcome these disadvantages, it is proposed in accordance with the invention to arrange within the handgrip of the torch itself a delay device for directly or indirectly bringing about a closing movement of the valve, which closes the valve upon expiration of the desired, preferably adjustable, delay period. Also the valve itself is preferably arranged within the torch handgrip. By means of the delay of the closing movement of the valve and of the resultant adjustable afterflow period of the inert gas, there result substantial advantages as compared with the afterflow of the inert gas from a container whose feed from the gas storage cylinder is interrupted by sudden closing of a valve. Among other things no additional space requirement arises and the cost of the delay device is relatively low. Owing to the small size possible for the device according to the invention, it is possible to arrange it within the torch handgrip and even to build it into already existing torches, since no increase in the diameter and length of the handgrip is necessary.

As a delay device there is preferably provided a device whose time determining member is the internal friction of a highly viscous liquid. The period of delay can be adjusted through the choice of the viscosity and/or through the regulation of the spring pressure which causes the required movement.

In accordance with a further embodiment of the invention, the delay mechanism includes two parts movable with respect to each other, preferably a fixed part and a part which is rotatable about the longitudinal axis of the former, between which is present the highly viscous liquid preferably a silicone oil. These parts are advantageously formed symmetric to each other upon rotation whereby, according to one operative example, a fixed piston is surrounded in sealing relation to a rotatable cylinder which is arranged coaxially to the piston at a slight distance therefrom. The cylinder upon which preferably a rotational force derived from a spring acts is connected with a mechanical system which directly or indirectly actuates the valve mechanism in a delayed fashion when it is made effective by unlocking of a delay device.

In order to regulate the time period of the delay, it is also possible to make the space between the parts of the delay device which are movable with respect to each other adjustable, whereby the charge of the device can be maintained constant.

As the friction liquid, there is preferably chosen a high viscous liquid whose viscosity is to a large extent independent of the temperature, in order to prevent that at various surrounding temperatures, for example due to heat radiation from the arc, an unintended change of the delay time occurs.

Further details concerning the invention are illustrated in the accompanying drawings and are more specifically described in discussing the operating example.

FIG. 1 shows a schematic illustration of the inventive subject matter;

FIG. 2 shows a practical operating example arranged in an inert gas welding torch;

Figure 3:
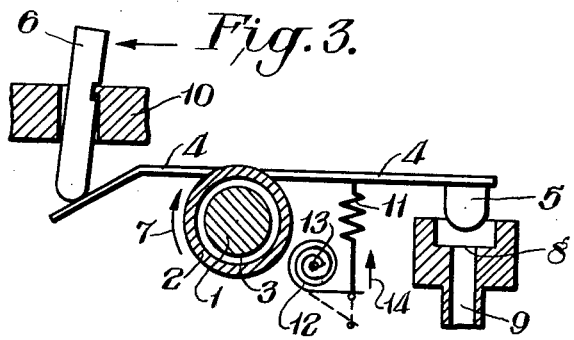
FIG. 3 illustrates an operative example employing a delay device for the closing movement of the inert gas valve wherein temperature compensation is achieved by means of a bimetallic spiral.

In FIG. 1 a fixed cylinder is represented by 1 about which there is arranged in a sealing relationship a cylinder 2. To this cylinder 2 is affixed a two-armed lever 4 which is provided at one end with a valve plunger 5. The other end of the lever 4 is held in a certain position by means of a locking pressure peg 6. If the pressure peg 6 releases the lever 4, then the cylinder 2 under the influence of the spring 11 will move concentrically about the piston 1 in the direction of the arrow 7, and the lever arm 4 which is firmly connected to the cylinder 2 will push the valve plunger 5 on the valve seat 8 and interrupt the gas flow through the conduit 9. The silicone oil present in the space 3 between the cylinder 2 and the piston 1 serves to delay the movement of the valve 5 through the action of the spring 11 in an adjustable reproducible manner. It is thereby attained that after interrupting the welding current by shutting down the current or breaking the arc that the electrode remains surrounded by the inert gas until it has cooled down. By means of a renewed intentional pressure on the pressure peg 6, the valve plunger 5 is again lifted, the gas valve opened, and the spring 11 tensioned. The operation can then again proceed. The easy possibility of adjusting the delay period, particularly by changing the pre-tensioning of the spring, is important in view of the fact that the strength of the welding current is frequently changed in practice and a correlation of the amount of inert gas afterflow to the current is desired in the interest of saving inert gas.

FIG. 2 shows a practical operating example of the invention. Here there is arranged in the torch handgrip 10 consisting of insulating material an inert gas conduit 12, 12', provided with a ball membrane valve 13. This valve is actuated by means of an actuating member 14 through the delay device 15 and the lever 16. The delay device 15 includes a fixed piston 17 surrounded in sealing relation by a rotatable cylinder 18. In the annular space 19 between the piston 17 and the cylinder 18 there is present a highly viscous oil. Also the cylinder 18 is provided with two projections 20 and 21. The projection 20 is in contact with the peg 22 of the actuating member 14, and the projection 21 is in contact with the lever 16. That lever is movably mounted at 23 and upon it there is exercised by means of a spring 24 a force in the direction of closing the valve 13.

When putting the torch into operation, in order to turn on the inert gas, the actuating member 14 in the form of a peg is pressed downwardly against the force of the spring 26 and is either continually held in this position or is locked in the housing 25. Such locking is accomplished thereby that the peg 14 is moved out of its operative direction by means of the projection 20 affixed to the cylinder 18, which has the form of an inclined plane, when this is moved in a counterclockwise direction, and is locked by means of the notched surface 28 beneath the projection 27 of the housing 25. When pressing down the peg 14 the cylinder 18 through the peg 22 and the projection 20 is turned in a counterclockwise direction. Upon such rotation the projection 21 lifts the lever 16 against the force of the spring 24 from the ball of the valve 13, so that the valve 13 is opened. By pressing down the peg 14, it is also possible in a manner not illustrated to simultaneously turn on the welding current so that almost simultaneously the warming up of the electrode 36 which projects from the torch body 38 (shown schematically in FIGURE 2) and the flowing out of the inert gas begin. It is, however, possible in the same manner to actuate only the inert gas valve by means of the peg 14.

The turning off of the torch (inert gas and if desired welding current) occurs by releasing the peg 14 that is by unlocking this peg which is moved upwardly by means of the spring 26. To the extent that the peg 22 of the actuating member 14 moves upwardly, the cylinder 18 would turn in a clockwise direction due to the lever arm 16 being pushed downwardly by the spring 24 and therewith the valve 13 would be closed immediately after turning off of the welding current, were it not for the silicone oil or the like filling the annular space 19. However, due to the inner friction of the silicone oil present in the annular space 19, the movement of the cylinder 18 is impeded so that the lever arm 16 moves downwardly much more slowly than does the peg 22 move upwardly. The movement of the peg 22 occurs in fractions of a second, whereas the movement of the lever until closure of the valve 13 is generally delayed for up to 15 to 20 seconds.

The delay can be regulated by adjusting the pressure exercised on the lever 16 by the spring 24. It is also possible to make the length of the lever 16 variable.

The use of the delay device according to the invention is not limited to the specific example given. It is also possible in the case of other welding torch constructions, for example in the case of autogenous torches to control in the same manner operations such as the increase or decrease of the amount of gas flowing out, which are to follow some other operation in a predetermined time interval.

The welding torches described above may suffer the drawback that the period of delay will be substantially reduced upon heating up of the delay device, due to a lowering of the viscosity of the friction medium used and/or to an enlargement of the space within which this friction medium is contained. Such a reduction of the delay period upon an increase of temperature is contrary to the technical requirements insofar as the heating up of the torch parts precedes a greater electrical or heat radiation loading, so that particularly in the cases of higher burner and workpiece temperatures the delay interval and therewith the duration of the afterflow of the inert gas should at least be kept constant in the interest of a greater protection of the electrode and workpiece.

It is therefore proposed in a further embodiment of the invention to provide the delay device for the closing movement of the valve with a member which at least partly compensates or overcompensates for its temperature dependence. Advantageously this member influences the member which produces the return force of the valve in the sense of at least partly compensating for the temperature induced change. According to a further proposal, the temperature dependence of the delay device is overcome by the choice of construction materials which display suitable coefficients of expansion.

For the member which compensates the temperature dependence of the delay device, one advantageously employs a bimetallic strip and/or an expansion regulator.

In FIG. 3 (cf. FIG. 1) a fixed piston is represented by 1 about which at a relatively slight distance there is surroundingly arranged a cylinder 2. At the cylinder 2 there is attached a two-armed lever 4 which is provided at one end with a valve plunger 5. The other end of the lever 4 is held fast in a particular position by means of a locking pressure peg 6. In case the pressure peg 6 releases the lever 4, then the cylinder 2 under the influence of the spring 11 will move about the piston 1 concentrically in the direction of the arrow 7 and the lever arm 4 firmly attached to the cylinder 2 will press the valve plunger 5 onto the valve seat 8 thus interrupting the flow of the inert gas through the conduit 9. The silicone oil which is present in the space 3 between the cylinder 2 and the piston 1 serves to delay the movement of the valve 5 resulting from the action of the spring 11. The return force of the spring 11 is influenced corresponding to the ambient temperature by means of the bimetallic spiral spring 12 held at its middle point 13, whose free end moves with increasing temperature in the direction of the arrow 14. Thereby the spring 11 is relieved of tension in dependence on the increase in temperature. Thus the closure time of the entire delay system is in the case of heating up to a large extent determined by the dimensions of the spiral spring 12. The position of the bimetallic spiral spring 12 at a lower ambient temperature is shown by broken lines.

Figure 4:
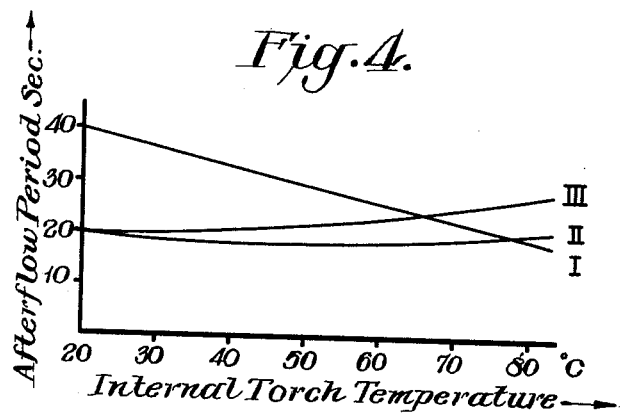
FIG. 4 represents a graph showing the characteristic curves for temperature compensated and uncompensated torches.

According to the dimensions of the spiral spring 12, it is possible to attain the time-temperature curves graphically illustrated in FIG. 4. The curve I of the graph applies to a torch which is not temperature compensated. It can be seen therefrom that the desired afterflow period of for example 20 seconds can only be attained in a torch heated to 80° C. if by means of the spring 11 one sets an afterflow period of about 40 seconds at 20° C.

The curve II applies to a torch which is provided with a bimetallic spring compensated for 80° C. The curve III illustrates an overcompensated delay device which may be employed in cases of particularly high temperature loads. Such a curve may for example readily be attained either by increasing the number of windings of the spiral spring 12 in FIG. 3 and/or by employing a further compensation strengthening device, for instance according to FIG. 5.

Figure 5:
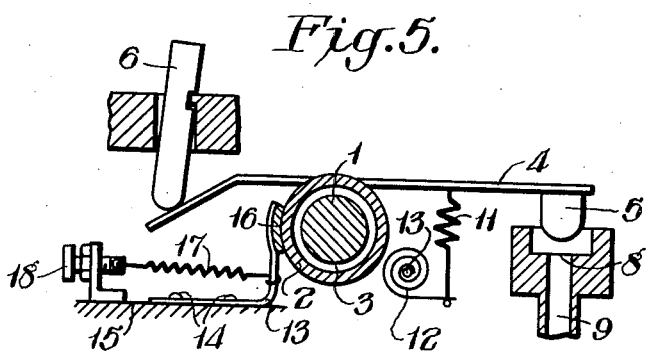
FIG. 5 illustrates a further operative example in accordance with the invention.

Besides the parts described in connection with FIG. 3, the device according to FIG. 5 includes a bimetallic strip 13 which is firmly connected to a fixed portion 15 of the torch at points 14 and is provided with a brakeshoe 16 which upon increasing temperature is pressed more firmly against the cylinder 2. A more sensitive adjustment of the braking action and a change of the temperature influence can be accomplished by regulating a countertension-producing spring 17 by means of the screw 18.

The invention may be reduced to practice in the most varied manner and is not limited to the operative examples shown in the drawings. In particular, one can employ instead of a bimetallic strip or spring other expansion systems whose effective medium may for example be a gas or a liquid, either alone or in combination. The invention also contemplates that other construction elements of the delay device, such as the power transmitting lever, may be made of a material having a strong dependence on temperature, primarily bimetals, whereby these construction elements can be made adjustable with respect to their mechanical behavior in relation to temperature.

We claim:

1. An inert gas welding torch having a torch body, an electrode in said body, a handgrip portion connected to said body, an inert gas conduit in said handgrip portion and said body, and means for regulating a temporary afterflow of inert gas following a welding operation, characterized in that said regulating means is in said handgrip portion, said regulating means including a supply valve communicating with said inert gas conduit, and delaying means for closing said supply valve after a predetermined period of delay.

2. An inert gas welding torch as set forth in claim 1 wherein said regulating means includes relatively moving parts and a highly viscous liquid, said delay means being operated by the inner friction of said highly viscous liquid between said relatively moving parts.

3. An inert gas welding torch as claimed in claim 2, wherein the relatively moving parts consist of a fixed piston and a surrounding cylinder which is coaxially rotatable.

4. An inert gas welding torch as claimed in claim 2, which is provided with temperature compensating means to offset temperature induced changes of the inner friction of the highly viscous liquid.

5. An inert gas welding torch as claimed in claim 4, wherein the temperature compensating means includes a bimetallic strip.

References Cited by the Examiner

UNITED STATES PATENTS

| 772,874 | 10/04 | Donaldson | 251—48 |
| 2,267,976 | 12/41 | Hermann | 137—79 |
| 2,376,265 | 5/45 | Meredith | 219—75 |
| 2,630,513 | 3/53 | Redmond | 219—136 |
| 2,829,492 | 4/58 | Kleinman | 137—79 |
| 2,862,098 | 11/58 | Hasselhorn | 219—74 |
| 2,878,063 | 3/59 | Kish et al. | |
| 2,991,015 | 7/61 | Standlick. | |
| 3,042,791 | 7/62 | Reeh | 219—75 |

RICHARD M. WOOD, *Primary Examiner.*
JOSEPH V. TRUHE, *Examiner.*